United States Patent

[11] 3,625,618

[72] Inventor Edward Evenden Bickel
      Santa Barbara, Calif.
[21] Appl. No. 868,815
[22] Filed Oct. 23, 1969
[45] Patented Dec. 7, 1971
[73] Assignee Infrared Industries, Inc.
      Santa Barbara, Calif.

[54] OPTICAL CONTOUR DEVICE AND METHOD
     11 Claims, 9 Drawing Figs.
[52] U.S. Cl. .................................................. 356/120,
     356/162, 356/166, 331/94.5
[51] Int. Cl. .......................................... G01b 11/24,
     G01b 11/30
[50] Field of Search.................................... 356/120,
     164, 165, 166, 167, 168, 209, 210, 212, 162;
     350/285

[56] References Cited
     UNITED STATES PATENTS

| | | | |
|---|---|---|---|
| 2,737,080 | 3/1956 | Mottu.......................... | 356/166 |
| 3,316,348 | 4/1967 | Hufnagel et al............... | 350/7 |
| 3,474,459 | 10/1969 | Silverman..................... | 350/285 |

FOREIGN PATENTS

| | | | |
|---|---|---|---|
| 1,136,048 | 12/1968 | Great Britain................ | 356/167 |
| 1,054,238 | 10/1953 | France ......................... | 356/165 |
| 275,478 | 1951 | Switzerland................... | 356/165 |

OTHER REFERENCES

R. D. Haun, Jr. " Laser Applications," IEEE Spectrum 5/68, pp. 82- 92

Primary Examiner—Ronald L. Wibert
Assistant Examiner—J. Rothenberg
Attorney—Dominik, Knechtel & Godula

ABSTRACT: A method and apparatus for optically measuring the contour of a surface in a given plane. A plane is generated by a narrow beam of light of low divergence, preferably the beam of light is generated by a laser, and the intersection of such a scan plane with the surface contour establishes points of intersection. Following intersection, the light rays are scattered and optically transferred to a conjugate image plane for observation, recording, comparison or measurement.

INVENTOR
Edward E. Bickel
BY
Dominik, Knechtel & Godula
ATTYS.

PATENTED DEC 7 1971 3,625,618

INVENTOR
Edward E. Bickel

BY Dominik, Knechtel & Godula
ATTYS.

INVENTOR
Edward E. Bickel

BY
*Dominik, Knechtel & Godula*
ATTYS.

PATENTED DEC 7 1971

INVENTOR
Edward E. Bickel

BY
Dominik, Knechtel & Godula

ATTYS.

OPTICAL CONTOUR DEVICE AND METHOD

The present invention relates to a method and device for optical contouring, that is, optical contour measurement and evaluation. More particularly the device relates to a system which employs a high-intensity source of light capable of generating a sectioning plane of light which impinges upon any given surface contour, and transferring that particular contour into an image. Such an image may conveniently be viewed, or be recorded on photographic material, but it will become apparent that other known devices and devices to be developed in the future can be employed for recording the image.

More particularly, an embodiment of the device and method contemplates the use of a narrow laser beam of low divergence which is translated into a fan or sheet of light which impinges as an incident or scanning plane of light upon any given surface. Through optical means the image of the intersection of the incident plane of light with the surface is transferred to viewable means which may be a record, such as photographic film or a viewing screen, or be converted to digitized electronic data.

Heretofore, contouring devices have been developed for photographing or otherwise determining the contour of a helical thread, model, and the like as exemplified in U.S. Pat. No. 3,269,264. Such devices suffer from the limitation of the light source employed. Light intensifiers may be utilized in the system to provide a sheet of light on the contour, but such intensifiers normally presuppose narrowing or constricting the sheet of light, and therefore the size of the structure which can be contoured is severely restricted. The present invention, in the very opposite fashion, looks to the provision of a high intensity, minimal diversion beam of light such as that generated by a laser, which can be translated into a fan or sheet of light of varying dimensions, projected as an incident plane of light onto a surface, and then be obliquely reflected or scattered and imaged by optical means to a light-sensitive viewable means, or image sensor. Although the foregoing refers to light it will be understood that other forms of electromagnetic radiation such as ultraviolet or infrared may be substituted in applications where appropriate nonvisual sensors are utilized.

One of the objects of the present invention is to provide a contour evaluator and comparator device and method which is equally as applicable to contouring the exterior of a device as the interior. A further and more detailed object of the invention is to provide for interior or exterior contouring which is effectively unrestricted as to the various stations of contouring. By various stations of contouring, it is meant that for a given movement of distance longitudinally of the interior of a gun barrel, or the exterior of a clay model, several contour records at close intervals may be made. Practical limitations of the application of the contouring will determine the number of stations in a given structure which may be contoured interiorly or exteriorly.

A further object of the invention looks to the provision of a contour evaluating and comparison system in which the depth of field is restricted to a small distance for a given test object surface to thereby permit the preparation of a complete contour of the surface area with one focal setting of the optical system of the unit.

It will be appreciated with a device and method of the character to be described hereinafter, that not only can an accurate contour be taken from a given model, but the same can be compared through a comparator. Comparator reference may be made to any optical device which compares a given contour or silhouette to an actual contour or silhouette being measured, generally speaking, in such a manner that inaccuracies may be readily determined and measured.

Further objects and advantages of the present invention will become apparent as the following description proceeds, taken in conjunction with the accompanying illustrative drawings, in which.

Figure 1:
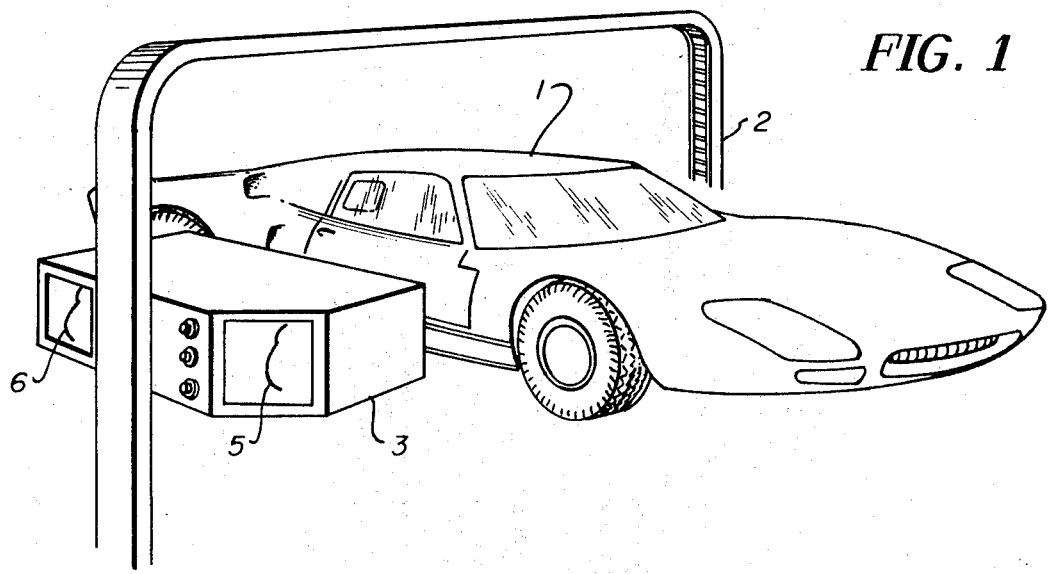
FIG. 1 is an optical scanner assembly for comparing the contour of a chassis with a predetermined master template contour, both shown in perspective.

Referring now to the drawings, FIG. 1 illustrates one important use for the method and apparatus as a contour comparator. An automobile with a newly designed chassis 1 is at a comparator zone defined by arch 2. Mounted to the arch is an apparatus 3 assembled in accordance with the teachings of this invention- The contour line 5 projected on the viewing screen is compared with a predetermined template contour 6 which can be simultaneously projected onto the viewing screen. It can then be determined whether the contour of the fabricated chassis 1 corresponds with sufficiently desired accuracy to the template contour previously established by smaller scale lines, design drawings, mathematics, or in other known ways. It will be understood that the apparatus may be used in a reverse way to measure, copy, or record the contours of an existing model. A relevant publication shows the use of other means for such purposes. (Prod. Mag., June, 1969, G.M. Process).

The method of this invention provides that an accurately contoured profile of a test object may be obtained by emitting a high intensity source of light of low divergence, and converting this high-intensity light into a fan or a sheet of light impinging on the surface of the test item. This sheet of light may be considered as either a sectioning or a scanning plane. It is a sectioning plane in that it intersects a surface contour of a test object and projects such a contour trace to an image plane as if such object were sectioned. Such a sectioning plane may be also referred to herein as scanning plane or as an incident plane of light. The sectioning plane of light forms points of intersection with the surface contour, and is then scattered substantially at right angles to form a line of intersection which is sensed as an image trace by a light-sensitive viewable means, or image sensor, positioned substantially optically perpendicular to the sectioning plane of light.

The viewable means, which is preferably optically parallel with and remote from the sectioning plane, may take the form of a screen, photographic material or still other forms. The contour image can be photographed accurately, and such contour image may be used to measure and record the contour of the test object. Likewise, the contour image may be compared with a master line or contour line template. The template contour line and the image contour line may both be fed onto the same screen where they may be compared side by side or in juxtaposition to determine accuracies of the contour surface of the test object with respects to the desired master line template. Reference may also be made to a "conjugate image plane" in which the image trace is joined with a template trace or with other measurements in the viewable means.

From the brief preceding description it is seen that the method and apparatus may be used as a contour comparator, a contour evaluator, a contour recorder, or in various combinations thereof. A matrix of radiation sensitive detectors may be used in place of photographic film and such detectors become illuminated in the image plane to correspond with the coordinates of the contour surface. Alternatively, a single row of radiation sensitive detectors can be moved to scan the image plane, and the scattered rays can then be read out in the image plane to provide a measurement of the contoured surface. Likewise, an electronically scanned receiver tube may be used similar to that employed in a TV camera.

Figure 2:
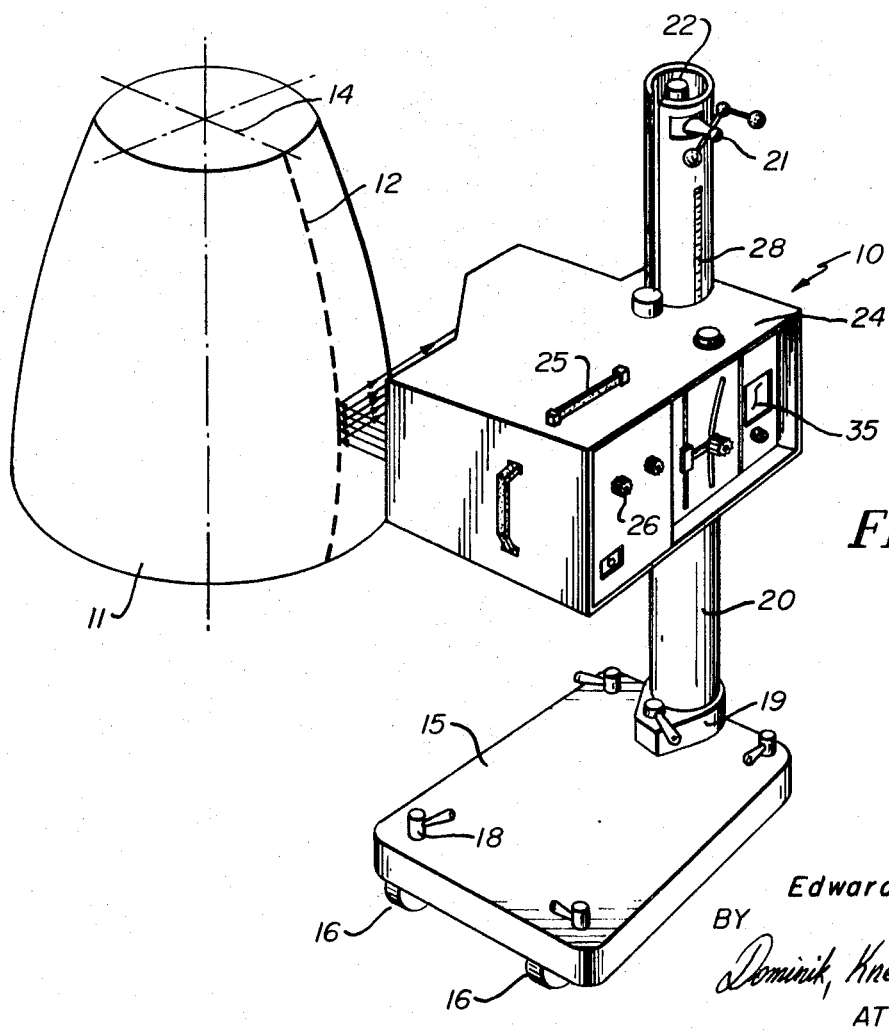
FIG. 2 is an enlarged view of an optical contour scanner shown in perspective with its accompanying test object which finds utility in comparing the contour of the specimen with a predetermined template.
Figure 3:
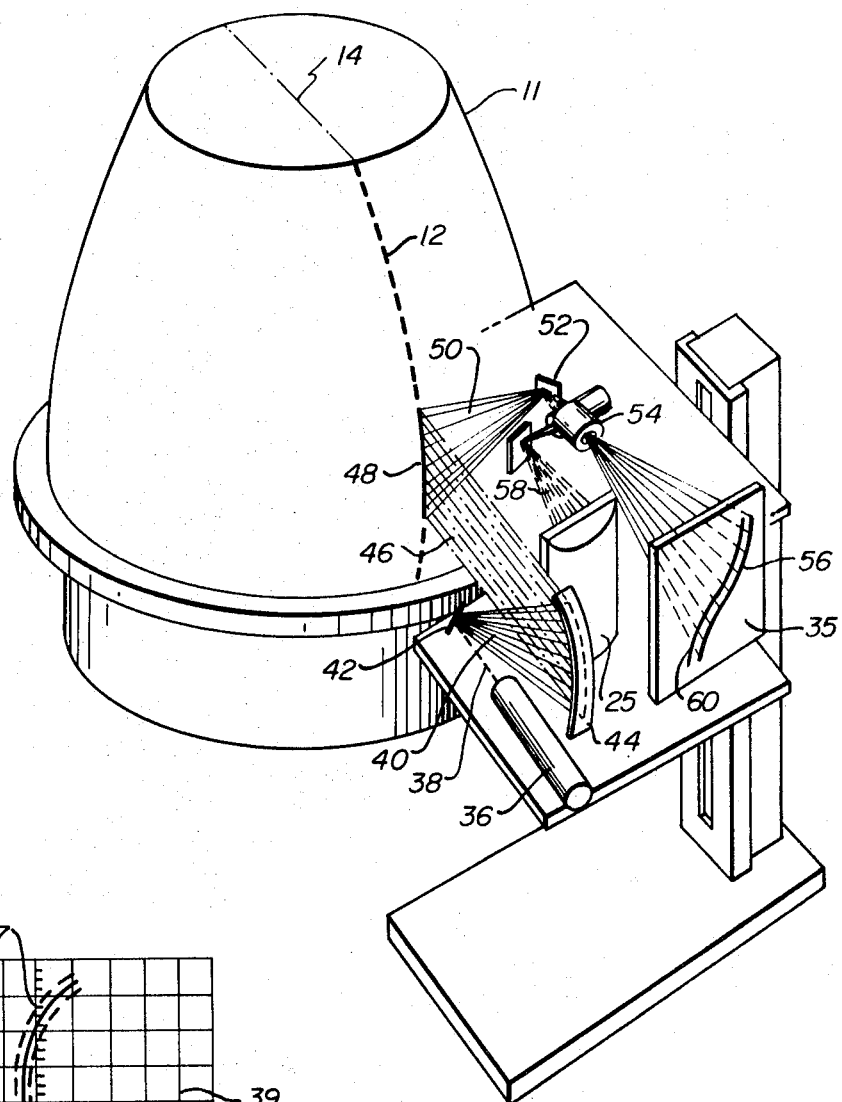
FIG. 3 is a perspective, partially diagrammatic view of a possible optical system employed in the optical contour scanner of FIG. 2.
Figure 4:
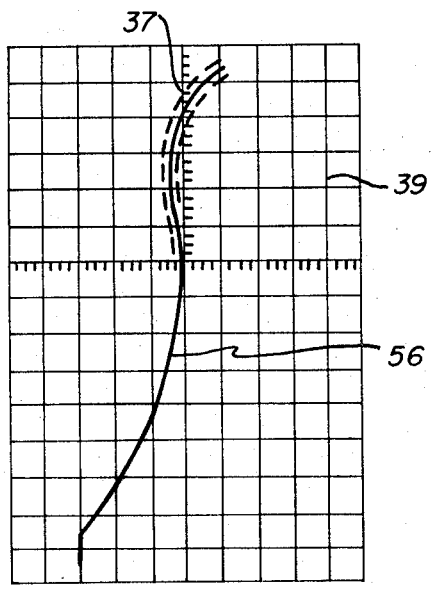
FIG. 4 is an enlarged view of a projected contour image line on a calibrated cross grid screen, wherein said image line is compared with calibrations on said screen.

The apparatus 3 of FIG. 1 has features such as those illustrated in more detail in the views of FIGS. 2–4, wherein the embodiment is in slightly different form, and is shown positioned to scan the surface contour of a test object 11 which is shown as a nacelle or pod for a jet engine. The contour surface is scanned along a contour trace 12 which may be viewed as coincidental with the section plane of the test object, indicated by line 14. The unit is mounted on a stand 15 which freely floats on the floor atop casters 16 which are adjusted upwardly or downwardly by jack screws 18. A level may be mounted on the stand 15 for developing a horizontal plane. A clamping collar 19 is secured atop the stand 15 with means for rotatably securing tubular support 20 which, in turn, slidably supports a console 24 which may be raised or lowered by the elevation control means (not shown) attached to post 22, and the elevation control 21.

In the illustrated device, the contour trace 12 is compared with a template 25 which is inserted into a slot in the top of the console 24. The template is adjusted by template adjustment means 26 to position a trace within a magnifier field or screen 35. The raising or lowering of the console 24 is monitored for accuracy by scale 28.

The use of the device as a comparator may include scanning both a test object and a template which presents the desired contouring. The template is positioned in a fixed relationship with the contoured surface, and the device is then used to scan one section, such as the upper part, of both the contoured surface and the template. The device is moved by a succeeding step to another section, such as the lower part, of the contour surface and the template. These steps are continued until all the sections of both the template and the contoured surfaces are scanned and projected onto the viewable means.

Referring now to FIG. 3, which is somewhat diagrammatic, there are shown and described features of the apparatus 10. The high-intensity source of light or laser beam 38 is shown emitted by a laser or laser source 36. The laser beam 38 is emitted as a substantially monochromatic, high intensity light of low divergence. The sectioning plane is generated by translating the laser beam into a fan of rays, collectively indicated at 40, by reflecting the laser beams from the convex surface of a cylindrical mirror 42. The fan of rays is reflected from the concave surface of a second cylindrical mirror 44 which forms the optical sectioning plane of light or incident plane of light 46. The intersection of the incident plane of light 46 and the surface of object 11 then defines the contour segment 48 of the contour trace 12. The light rays are scattered from the incident plane of light 46 along the contour line segment 48 in a direction substantially normal to said plane. The scattered light rays are then sensed by viewable means which may include an optical relay system having mirror 52 and a relay lens unit 54. The scattered light rays 50 form the contour image line 56 in an image plane, shown here as a screen or magnifier field 35. The relay lens unit 54 may also include means for magnifying or reducing the contour lines 56 to desired scaling.

In this embodiment, the master line template 25 has a light source which projects the template contour as a beam of light 58 into the relay system which conveys and forms a template trace 60 on the light-sensitive viewable means. The image trace 56 and the template trace 60 may therefore be compared, and deviations from desired accuracies can be measured by use of a scale, such as scale 62 which may be part of a calibrated orthogonal grid chart. In FIG. 4, the projected contour trace 56 is shown projected on a calibrated cross grid screen 39 in which the desired contour is indicated by calibration lines 37.

In place of the diverging fan of rays, the laser beam may be translated into a collimated sheet of light, that is, a sheet comprising a parallel bundle of rays. This may be done by conventional means including diverging a high-intensity light through a pinhole or by optical reflectors, and forming the parallel bundle of rays by a lens, or by back reflection from a parabolic mirror.

Figure 5:
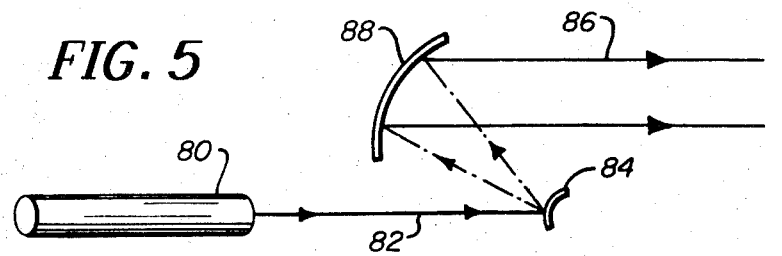
FIG. 5 illustrates an optical cylindrical mirror for generating the incident plane of laser light.
Figure 6:
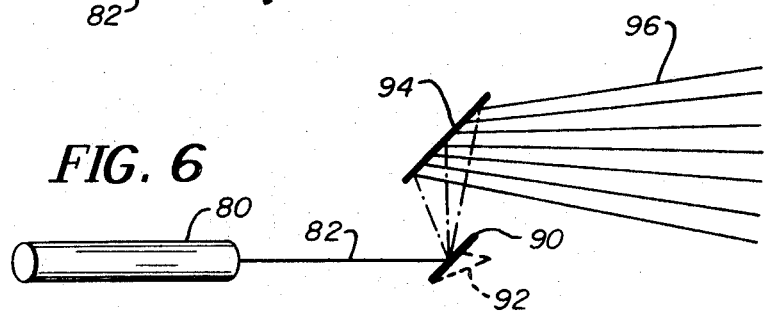
FIG. 6 illustrates diagrammatically the use of a wobble mirror to generate an incident plane of laser light.

FIGS. 5 and 6 diagrammatically illustrate means to generate a sectioning plane of light from a high intensity, narrow beam of light. In FIG. 5 the laser 80 emits the narrow beam 82 which is expanded by cylindrical mirror 84 to and reflected by mirror 88 to form a sectioning plane of light 86 comprising a series of substantially parallel rays of light. In FIG. 6 the narrow beam of high intensity light 82 is expanded by a wobble or oscillating plane mirror 90. The mirror wobbles or oscillates about an axis perpendicular to the plane of the diagram, and such wobbling or oscillation is indicated by phantom line 92 indicating the position of the mirror in an extremely rotated position. The series of divergent rays are reflected by a fixed mirror 94 to form the incident plane of light 96. In place of the wobble mirror 90, a fixed mirror may be positioned and the laser 80 may be mechanically oscillated or translated to thereby expand the beam 82 to form a plurality of intersection points on the surface of a fixed mirror in place of the wobble mirror 90. Various other means may be used to translate the narrow beam into a sectioning plane, such as using a rotating or oscillating prism having a plurality of surfaces parallel to the axis of rotation, using an optical system of cylindrical surfaces, oscillation of the laser beam, or various combinations of the foregoing.

Figure 7:
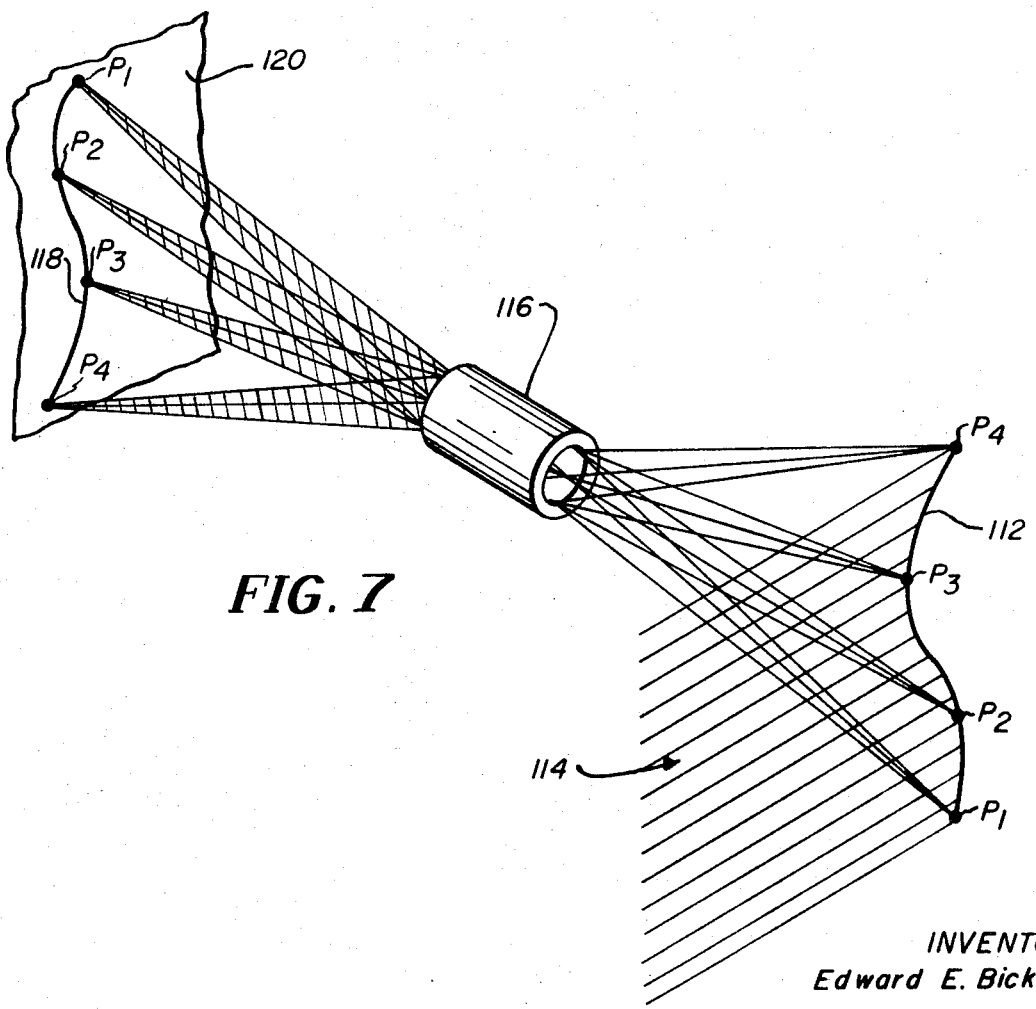
FIG. 7 illustrates the means for translating the intersection of the sheet of light on a surface to display the same in an image plane.

FIG. 7 diagrammatically shows light rays deflected from the contour surfaces or contour boundary 112 with respect to sectioning plane of light 114 which has been generated from a high intensity beam. The boundary 112 has designated contour points $P_1$–$P_4$ which are represented as being picked up by lens relay system 116, and then conveyed as inverted points in contour line 118 in image plane 120.

Figure 8:
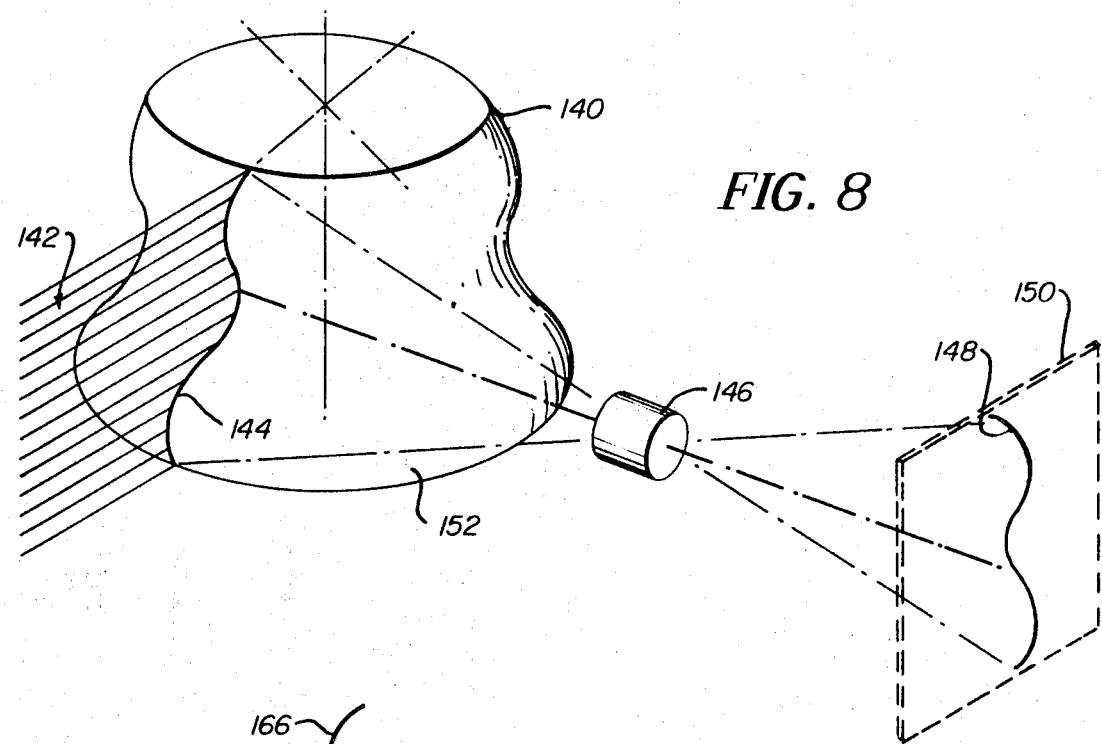
FIG. 8 illustrates some limitations of the field of view.

FIG. 8 diagrammatically illustrates how the contour surface line 144 of a test object 140 may be accurately recorded as a contour line 148 in an image plane 150. The incident plane of light 142 is deflected at the surface contour line, and the deflected line of intersection 152 is conveyed by relay lens system 146 for recording in the image plane 150. The contour surface line 144 and the contour image line 148 have an accurate 1:1 relationship as set by the relay lens system 146. By modifying the magnification of the optical relay lens system, scaled outline of a given test object can be produced by such optical sectioning.

In one type of application, the surface contour will be scanned with an incident plane of light which will optically section the contour surfaces at preselected intervals. The deflected lines of intersection will accordingly be relayed or otherwise conveyed to the light-sensitive viewable means in repeated steps until a contour picture is sufficiently established by a plurality of contour image lines. In one preferred form, the plurality of contour image lines will be photographed at the light-sensitive viewable means to obtain a photographic film with the plurality of contour lines showing the contour picture.

Figure 9:
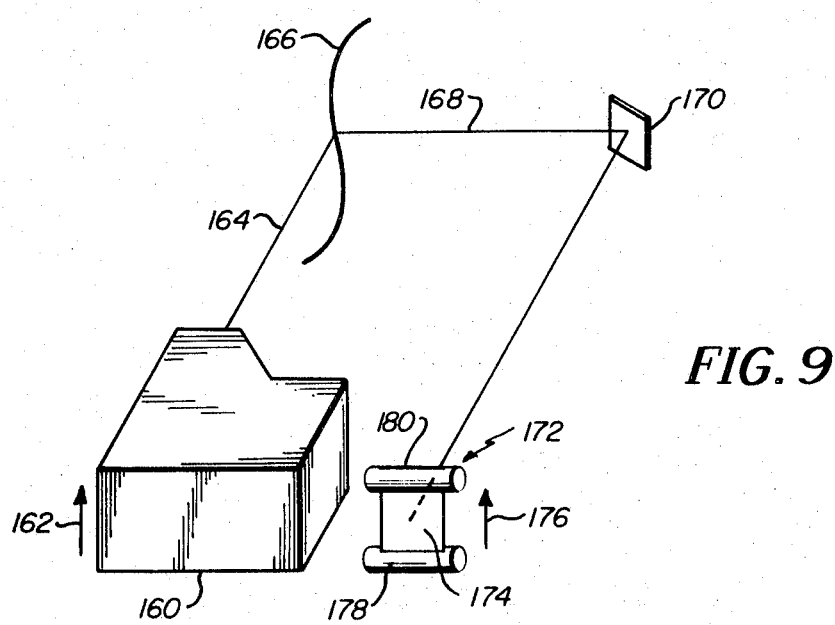
FIG. 9 is a perspective of an alternative embodiment wherein a laser beam is generated to follow a contour trace which is transferred to a conjugate image plane.

The highly diagrammatic view of FIG. 9 illustrates another embodiment for projecting a contour trace steps which in their totality operate in the manner of the previously disclosed sectioning plane, line of intersection, and projection in a conjugate image plane. A laser emitting device 160 is movable in a vertical plane at a controlled rate, as indicated by arrow 162. A laser beam 164 scans contour surface 166 in steps commencing at the bottom of the contour surface and moving towards the top thereof. The movement of the laser beam 164 over the contoured surface operates, therefore, in the manner of a sectioning plane. At each step, the laser beam of the sectioning plane is scattered at a substantially right angle to obtain a scatter ray 168. The ray is directed by relay means 170 onto an image sensor 172, shown here as photographic film 174 moving in a vertical plane, as indicated by arrow 176. The film moves at a rate of travel which is in synchronization with the rate of travel of the laser emitting device 160. The film 174 may be advanced in various ways such as from bottom magazine 178 to upper magazine 180.

Practitioners may readily alter and modify various aspects of the invention to meet requirements in the use of the invention. It is one advantage of the invention that a test object may be placed any where within the combined fields of the sectioning light plane and the light-sensitive viewable means and the contour image will be in focus. This permits the optical system of the contour scanner to operate with one focal setting for added convenience. It will be appreciated that interior surface contours may be scanned and recorded, as well as the exterior surfaces. It is only required that there be no obscuration points between the intersection of the incident plane of light with the contour surface and the relay lens or viewable means which views the deflected lines of intersection.

What is claimed is:

1. The method of obtaining a viewable surface contour of a test object, comprising the steps of
    emitting a laser beam which is a high-intensity narrow beam of light of low divergence,
    generating a sectioning plane by converting said narrow beam into a plurality of light rays,
    impinging said sectioning plane onto the surface contour of said test object to effect points of intersection,
    positioning light sensitive viewable means including photographic recording means remote from and substantially optically perpendicular to the sectioning plane of light, and
    receiving intersection light rays, scattered from intersection points of said sectioning plane and said test object, as a contour trace in an image plane in said light-sensitive viewable photographic recording means to obtain a permanent record of said surface contour.

2. The method which includes the steps of claim 1 above, and which further includes
    impinging said sectioning plane of light and scattering said intersection rays at a plurality of contouring stations along a predetermined length of said contour surface to obtain a corresponding plurality of viewable contour line traces sufficient to obtain a desired contoured profile of the test object.

3. The method which includes the steps of claim 2 above, and which further includes
    providing a preselected magnification relationship between the sectioning plane and the image plane to obtain a desired scaling of the contour traces of the test object.

4. The method which includes the steps of claim 1 above, and which further includes
    projecting light through a master line template of the contoured surface of the test object onto the light-sensitive viewable means to form a master template trace thereon, and
    superimposing said projected master line template trace onto said image plane to ascertain any departures from the contour line trace of the test object.

5. The method which includes the steps of claim 1 above, and which further includes
    superimposing a calibrated orthogonal grid chart on the light-sensitive viewable means, and
    measuring the coordinates of the contour trace of the test object on said light-sensitive recording means.

6. An apparatus for scanning and viewing a projected surface contour of a test object, including
    means to emit a laser beam which is a high-intensity, narrow beam of light of low divergence,
    means to convert said high-intensity beam of light into a sectioning plane characterized by a plurality of light rays,
    means to impinge said sectioning plane of light on said contoured surface,
    a light-sensitive image sensor positioned substantially optically perpendicular to said sectioning plane to receive scattered light rays from the line of intersection of said sectioning plane and said surface contour as a trace on an image plane in said image sensor,
    a master line template, and
    means to project a contour trace from said template onto said light-sensitive image sensor to thereby compare the surface contour trace with the template contour trace on said image sensor.

7. An apparatus which includes the features of claim 6 above, and which further includes
    a calibrated orthogonal grid chart associated with said light sensitive image sensor, said chart permitting evaluation of the surface contour by measurement of the contour trace.

8. An apparatus which includes the features of claim 6 above, and which further includes
    a relay lens system interposed between the sectioning plane of light and the image sensor, said relay lens system picking up the light from said intersection and transferring said intersection light rays as an intersection to the light-sensitive image sensor.

9. An apparatus which includes the features of claim 8 above, and which further includes
    means associated with said relay lens system to selectively magnify said intersection image on the light-sensitive image sensor to attain desired scaling of the surface contour.

10. An apparatus which includes the features of claim 6 above, wherein
    said light-sensitive image sensor is a permanent photographic record.

11. An apparatus which includes the features of claim 6 above, and which further includes
    a pivotably mounted and vertically adjustable housing positioned relative to said test object, said housing including
    optical means to selectively expand said laser beam to obtain said sectioning plane,
    a relay lens system to transfer the scattered light from the line of intersection to the image sensor,
    a calibrated chart mounted at said image sensor,
    means to adjustably receive said master template trace corresponding to the desired contour surfaces of the test object, and,
    means to desirably scale the contour trace and the master template trace relative to said calibrated chart to measure any departures of the contour trace from said master template trace.

* * * * *